US007988471B2

(12) United States Patent
Matsumoto et al.

(10) Patent No.: US 7,988,471 B2
(45) Date of Patent: Aug. 2, 2011

(54) CARD CONNECTOR WITH EJECTION DAMPER

(75) Inventors: Yasuyoshi Matsumoto, Yamato (JP); Mitsuhiro Tomita, Yamato (JP); Yoko Takeuchi, Yamato (JP)

(73) Assignee: Molex Incorporated, Lisle, IL (US)

( * ) Notice: Subject to any disclaimer, the term of this patent is extended or adjusted under 35 U.S.C. 154(b) by 220 days.

(21) Appl. No.: 12/083,955

(22) PCT Filed: Oct. 24, 2006

(86) PCT No.: PCT/IB2006/004230
§ 371 (c)(1),
(2), (4) Date: Sep. 23, 2009

(87) PCT Pub. No.: WO2007/113620
PCT Pub. Date: Oct. 11, 2007

(65) Prior Publication Data
US 2011/0070759 A1      Mar. 24, 2011

(30) Foreign Application Priority Data

Oct. 24, 2005   (JP) .................................. 2005-308562

(51) Int. Cl.
*H01R 13/62* (2006.01)
(52) U.S. Cl. ....................................... 439/159; 235/441
(58) Field of Classification Search .................. 439/159, 439/152–158, 160; 235/441, 486
See application file for complete search history.

(56) References Cited

U.S. PATENT DOCUMENTS

| | | | | |
|---|---|---|---|---|
| 4,257,581 A | * | 3/1981 | Keeler, II | 267/116 |
| 5,038,331 A | * | 8/1991 | Ogawa | 369/30.89 |
| 5,084,859 A | * | 1/1992 | Ishibashi et al. | 369/134 |
| 6,124,707 A | * | 9/2000 | Kim et al. | 324/754.08 |
| 6,155,853 A | | 12/2000 | Kajiura | |
| 6,370,100 B2 | * | 4/2002 | Koshino et al. | 720/602 |
| 7,566,238 B2 | * | 7/2009 | Tracy et al. | 439/382 |

FOREIGN PATENT DOCUMENTS

| | | |
|---|---|---|
| EP | 1 174 956 A2 | 1/2002 |
| JP | 10069526 | 3/1998 |
| JP | 11224726 | 8/1999 |
| JP | 200250104 | * 2/2002 |

OTHER PUBLICATIONS

International Search Report for PCT/IB06/004230.

* cited by examiner

*Primary Examiner* — Michael C Zarroli
(74) *Attorney, Agent, or Firm* — Timothy M. Morella

(57) ABSTRACT

A card connector has a housing with a base and a side rail extending from the base to define a card-insertion cavity. A plurality of conductive terminals are supported by the housing and extend at least partially into the card-insertion cavity for contacting a card inserted into the card-insertion cavity. A push-push style card locking and ejection mechanism retains the card in the card-insertion cavity upon a first push and which ejects an inserted card upon a second push. The mechanism includes a slide member positioned for slidable movement on the side rail and a biasing member contacting the slide member for selectively exerting an ejection force on the slide member. The slide member includes a slide surface that slides along a guide surface of the side rail. A damping material is interposed between the slide member slide surface and the guide rail guide surface for retarding movement of the slide member on the side rail in response to an ejection force from the biasing member.

16 Claims, 7 Drawing Sheets

CARD CONNECTOR WITH EJECTION DAMPER

BACKGROUND OF THE INVENTION

1. Field of the Invention

The present invention relates to a card connector and more particularly to a card connector with an ejection damper.

2. Description of the Related Art

Conventionally, electronic equipment, such as a personal computers, portable or mobile telephones, PDAs (personal digital assistant), digital cameras, video cameras, music players, game machines, and car navigation systems, are equipped with card connectors adapted for use with various types of memory cards such as a SIM (subscriber identity module) card, an MMC® (multi media card), an SD® (secure digital) card, a mini SD® card, an xD picture card® (xD-Picture card), a memory stick®, a memory stick Duo®, a smart media®, a T-Flash (Trans-Flash) memory card, a micro SD® card, and the like.

Recent card connectors generally have, for ease of handling, a "push-push" structure in which a user handles a memory card so as to push it in order to both insert and discharge the card from a connector. However, with a card connector having the push-push structure, in discharging a card, the card is urged to slide by the repulsive force of a spring. This increases the travel speed of the card or a slide member holding the card, so that the card might dash or pop out or the slide member might collide with a stopper member resulting in mechanical shock. For this reason, there has been proposed such a technique that a speed reducer is used for slowing the travel speed of a card or a slide member down in discharging the card (for example, see Japanese Patent Application Laid-Open No. 2003-31307).

FIG. 7 is a schematic view illustrating a conventional card connector which includes a socket body 301 of a card connector, and a memory card (not shown) is inserted in direction "A." The card connector has a slide cover 302 slidably mounted on the socket body 301, and an eject unit (not shown) for discharging a memory card inserted between the socket body 301 and the slide cover 302. The eject unit discharges a memory card by urging the slide cover 302 and the memory card to slide downwardly, as viewed in FIG. 7, by the repulsive force of a spring such as a torsion coil spring. The back of the socket body 301 is provided with a substrate 303 including for example electric terminals making contact with pads of the memory card, and a cable 304 connected to the substrate 303.

A speed reducer 305 is disposed on one side of the socket body 301. The speed reducer 305 has an oil damper 307 attached to a receptacle container 309 that houses therein the card connector, a gear 308 on which rotational resistance is exerted by the oil damper 307, and a rack 306 that is formed on one side surface of the slide cover 302 to be engaged with the gear 308.

With this construction, the speed reducer 305 can slow the travel speed of the slide cover 302 when a card is discharged from the card connector. This eliminates the possibility that the card is ejected too quickly, or that the slide cover 302 collides with a stopper member (not shown) thereby subjecting the card to mechanical shock.

The conventional card connector needs to have attached thereto, speed reducer 305 provided with oil damper 307, gear 308, and rack 306 rendering the structure somewhat complicated and increasing the cost. Moreover, disposition of the speed reducer 305 on the side of the socket body 301 increases the width of the card connector, thus making it difficult to miniaturize the card connector.

SUMMARY OF THE INVENTION

The present invention aims at overcoming the above-mentioned problems encountered by the conventional card connector, and makes it an object to provide a card connector configured in a manner such that a viscous dampening material such as a grease or other lubricant is applied between a slide surface of a guide member of a card guide mechanism, and a guide surface that guides the guide member. This material has the capability of exhibiting a damping effect provided by the lubricant when a slide member is returned by an urging member. Further, the stable damping effect can be attained by an additional arrangement such that an abutment part slidingly contacts with the inner side of a case thereby to limit its upward movement in order to maintain a spacing between the guide surface and the slide surface within a predetermined amount. This arrangement eliminates the necessity to separately dispose a mechanism for speed reduction, thus permitting a simple, low cost, and miniature structure. This arrangement also slows down the speed of the guide member during discharging of a card, so that a card is not permitted to be rapidly ejected toward the exterior, and reduces mechanical shock when the guide member is stopped.

Therefore, a card connector according to the present invention includes a housing that houses a card having an electric terminal member; an electric connecting terminal that is attached to the housing and comes in contact with the electric terminal member of the card; a case having a flat plate part that is attached to the housing; and a card guide mechanism that has a slide member to press a card inserted into the housing in a direction opposite to an insertion direction, and an urging member to urge the slide member in the opposite direction of the insertion direction of a card. When the slide member moves in the insertion direction and reaches a terminus by a push action that causes the slide member to stop at a lock position and causes the card to be pushed in the insertion direction, the slide member is caused by urging force of the urging member to move from the terminus in the opposite direction of the insertion direction to thereby allow the card to be discharged. The case covers with the flat plate part at least the slide member and a part of the inserted card. The housing has a guide surface that guides the slide member. The slide member has an engaging part that is able to engage the card, a slide surface that comes in slide contact with the guide surface, and an abutment part that opposes to the flat plate part of the case on the opposite side of the slide surface. The abutment part comes in slide contact with the flat plate part to thereby limit movement of the slide member toward the flat plate part, and a lubricant is applied between the guide surface and the slide surface so that the guide surface and the slide surface are in slidable contact with each other via the lubricant.

In another connector for card according to the present invention, due to application of the lubricant, the speed of traveling of the slide member that is moved from a terminus in the opposite direction of the insertion direction by the urging force of the urging member may be slowed down.

In still other connector for card according to the invention, the lubricant may be grease that is not more than 310 in consistency.

In still other connector for card according to the present invention, the slide surface is provided with at least one lubricant reservoir part for reserving the lubricant.

In still other connector for card according to the present invention, the guide surface is provided with at least one lubricant reservoir part for reserving the lubricant.

In still other connector for card according to the present invention, at least one side edge of the guide surface is provided with a partition-wall extending in the insertion direction and preventing the lubricant from flowing out of the connector for card.

In still other connector for card of the invention, the guide surface is further provided with a lubricant storage groove for storing the lubricant, adjoining the partition and extending in the insertion direction.

In still other connector for card of the invention, the engaging part holds a card at strength so as not to allow the card to slip from the slide member when discharging the card by causing it to move from a terminus in the opposite direction of the insertion direction.

In accordance with the present invention, lubricant is being applied between a slide surface of a guide member of a card guide mechanism for guiding a card inserted into a connector for card, and a guide surface for guiding the guide member. The damping effect owing to the lubricant is attainable when an urging member returns a slide member. Further, the stable damping effect is attainable by arranging such that an abutment part slidingly contacts the inner side of a case thereby to limit its upward movement in order to maintain the space between the guide surface and the slide surface within a predetermined amount. This arrangement eliminates the necessity to separately dispose a mechanism for speed reduction, thus permitting a simple structure, a low cost, and miniaturization. This arrangement also decreases the speed of the guide member in discharging a card, so that a card does not dash out, and no shock occurs when the guide member comes to a stop.

Another memory card connector according to the present invention may include a housing for receiving a memory card therein. The housing having a base portion and at least one side rail extending from the base portion to cooperatively define an interior space into which the memory card can be inserted by a user. The housing base portion supports a plurality of conductive terminals at least partially within the connector interior space. A slide member is provided for guiding a memory card into and out of the connector interior space with the slide member being slidable in first and second, opposite directions along the side rail. The slide member includes a slide surface that contacts and slides along the one side rail. A biasing member is provided to apply a biasing force to the slide member to urge the slide member in the second direction. A reservoir is interposed between the slide surface and the side rail with the reservoir including a viscous damping material having a consistency sufficient to at least partially retard a biasing force applied by the biasing member to a memory card located in the connector interior space to retard movement of the slide member and the memory card in the second direction.

If desired, the reservoir may be disposed in the one side rail. In addition, the viscous damping material may have a consistency of less than about 310 as measured according to Japanese Industrial Standard K2220-5.3.2. The viscous damping material may also have a consistency of no more than about 280 as measured according to Japanese Industrial Standard K2220-5.3.2. Still further, the viscous damping material may have a consistency between about 280 and about 310 as measured according to Japanese Industrial Standard K2220-5.3.2. The viscous damping material may be a torque grease. The viscous damping material may be contained within a packet which is disposed in the reservoir. In the alternative, the viscous damping material may include a viscous gel.

If desired, the reservoir of the card connector may include a first recess disposed in the slide rail. The reservoir may also include a plurality of recesses disposed in the slide rail. Still further, the recesses may be spaced apart from each other and arranged in a line along said side rail. The one side rail may include a guide surface that opposes the slide member slide surface and the reservoir is in contact with one of the slide surface and guide surface. The side rail may further include a barrier wall that separates the reservoir from the connector interior space. If desired, the first recess may be generally rectangular. The card connector may further include a second guide rail spaced apart from the one guide rail and the biasing member is disposed along the one guide rail.

Still another memory card connector according to the present invention may include a housing with a base and first and second spaced-apart side rails extending from the base to define a card-insertion slot therebetween. A plurality of conductive terminals are supported by the housing, and extend at least partially into the card insertion slot for contacting a card inserted into the card-insertion slot. A push-push style card locking and ejection mechanism is provided which retains a card in the card-insertion slot upon a first push and which ejects an inserted card upon a second push. The mechanism includes a slide member positioned for slidable movement on the first side rail and a biasing member contacting the slide member for selectively exerting an ejection force on the slide member. The slide member includes a slide surface that slides along a guide surface of the first side rail. A damping material is interposed between the slide member slide surface and the first guide rail guide surface for retarding movement of the slide member on the first side rail in response to the ejection force.

The damping material may have a consistency of no more than about 310 as measured according to Japanese Industrial Standard K2220-5.3.2. In the alternative, the damping material may have a consistency of no more than about 280 as measured according to Japanese Industrial Standard K2220-5.3.2. Still further, the first guide rail may include at least a first recess formed therein with the first recess containing the damping material.

The reservoir may include a plurality of recesses and the recesses may be arranged in a line along said first guide rail. The first guide rail may include a barrier wall separating the guide member guide surface from the card-insertion slot to substantially prevent migration of the damping material into the card-insertion slot.

Other objects, features and advantages of the present invention will be apparent from the following detailed description taken in conjunction with the accompanying drawings.

DESCRIPTION OF THE PREFERRED EMBODIMENTS

Preferred embodiments of the present invention will now be described in detail with reference to the accompanying drawings.

Figure 1:
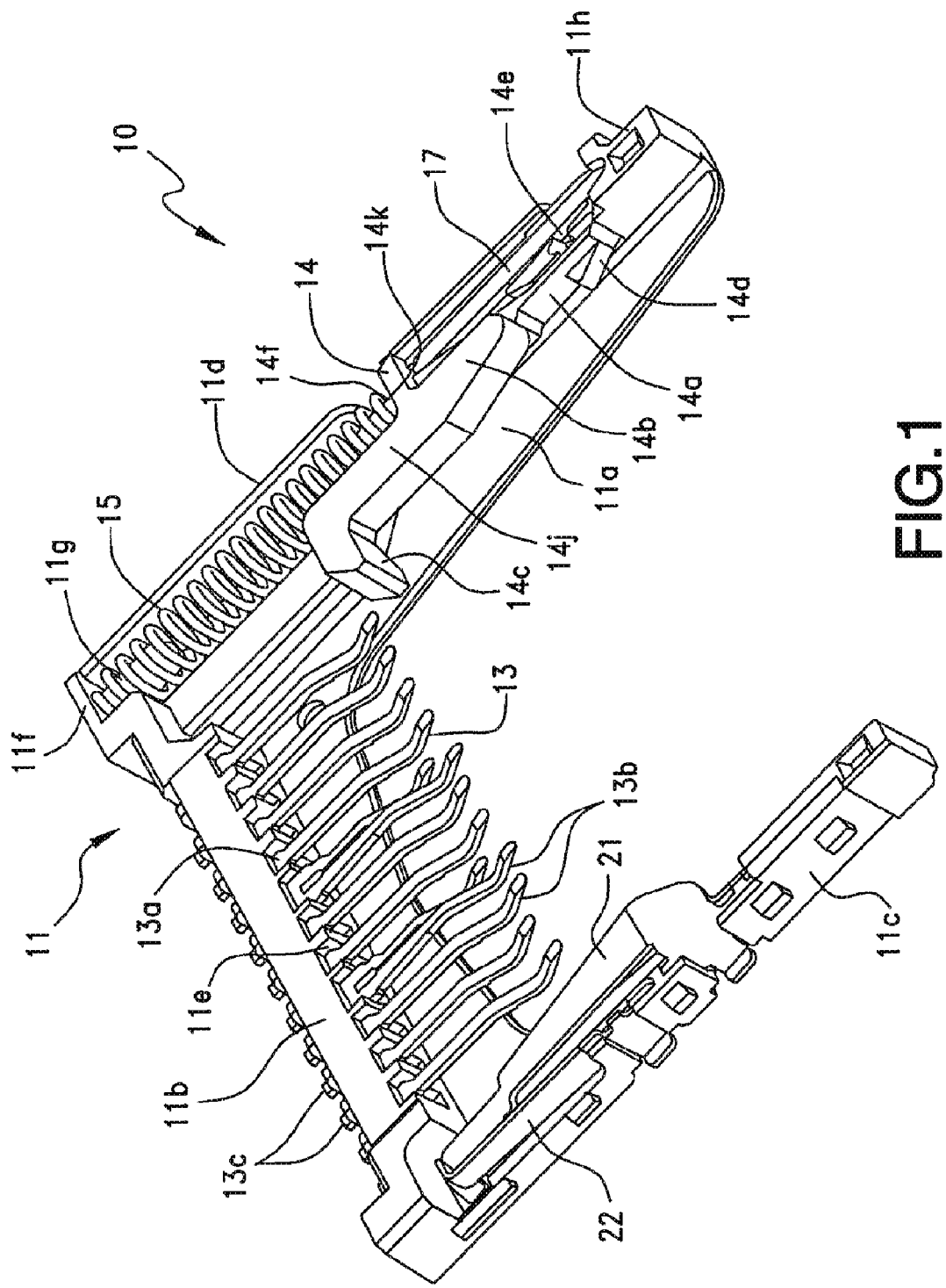
FIG. 1 is a perspective view of a card connector according to a first preferred embodiment of the present invention with a shell removed.
Figure 2:
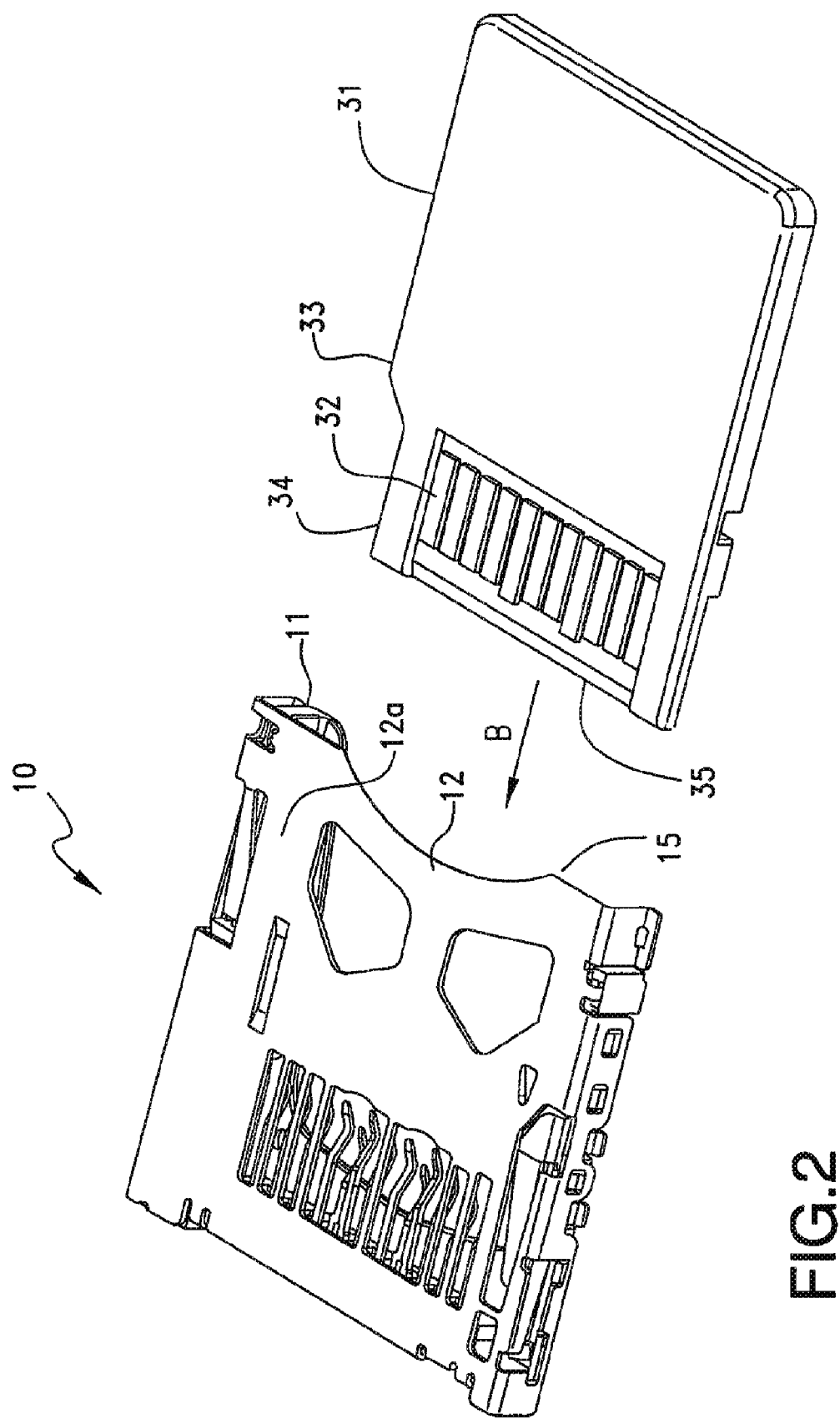
FIG. 2 is a perspective view of the card connector assembly of the present invention with a memory card aligned for insertion into the connector assembly.

Referring first to FIGS. 1 and 2, a card connector, generally indicated at 10, according to a first preferred embodiment is shown. Card connector 10 is configured to be attached to electronic equipment (not shown) and receive a card 31 therein, so that card 31 is attached via the card connector 10 to the electronic equipment. For example, the electronic equipment may be any type of equipment such as a personal computer, a portable or mobile telephone, a PDA, a digital camera, a video camera, a music player, a game machine, a car navigation system, or the like.

The card 31 may be any kind of card, for example, an IC card such as an SIM card, MMC®, an SD® card, a mini SD® card, an xD picture card®, a memory stick®, a memory stick Duo®, a smart media®, a T-Flash memory card, a micro SD®, or the like. The first preferred embodiment describes the card 31 as a mini SD® card. In the following description, it should be understood that the expressions of respective directions such as up, down, left, right, front, and rear that are used to explain the construction and operation of respective parts of the card connector 10 are not absolute but relative expressions. That is to say, these expressions will be appropriate when the card connector 10 and its parts take up the position shown in the drawings. However, when they take another position, the description should be changed and interpreted according to a change in position of the card and its parts for purposes of understanding.

Referring now to FIG. 2, the card connector 10 has a housing 11 for housing a card 31 that is integrally formed by an insulating material such as synthetic resin, and a shell 12 as a case attached to the upper side of the housing 11, which can be formed by subjecting a plate composed of a conductive material such as metal to the machining operation including punching, bending, and the like. A top surface 12a of the shell 12, which is shaped like a flat plate, covers part of a card 31 inserted in the card connector 10 and covers slide member, indicated generally at 14, over its entire working range. The card connector 10 in the general shape of a flat rectangular body is attached to the electronic equipment. The card 31 is inserted and removed from the front of the card connector 10 (on the right side as viewed in FIG. 2) along axis "B." Further description will be made with the card 31 inserted into the card connector 10 as shown in FIG. 2. such that electric contact pads 32 of card 31 face upwards to engage electric terminals 13 of connector 10.

In FIG. 1, the shell 12 has been removed for clarity. Housing 11 has a bottom or lower wall 11a having such a shape that the front edge side (on the right and downward side as viewed in FIG. 1), which is the front with respect to the insertion direction B of the card 31, is formed in substantially a U-shape, and a rear wall 11b that extends along the rear edge at the connector 10 and stands vertical from the bottom wall 11a. The rear wall 11b is provided with a plurality of terminal receiving or loading holes 11e formed so as to extend all of the way through rear wall 11b in a direction parallel to insertion direction B. A securing or root portion 13a of each terminal 13 engages each hole 11e to secure each of the terminals in a terminal loading hole 11e. The terminals 13 extend toward the front edge of the housing 11, and include contact portions 13a adjacent their tip portions and engage the contact pads 32 disposed on the upper surface of the card 31 thereby to establish electrical connection between the card connector 10 and card 31. Each solder tail portion 13c extends from each of the root portions 13a of the terminals 13 and projects rearwardly from the rear edge of the bottom wall part 11a, and is electrically connected by soldering or the like to a contact pad, or other counterpart electric terminal member, formed on a circuit member or board or the like and adapted to be mounted in some type of electronic equipment.

Housing 11 has a first side part or arm 11c having an L-shaped cross-section and extending parallel to the insertion direction B along one side edge of the bottom wall 11a, and a second side part or arm 11d extending parallel to the insertion direction B along the other side edge of the bottom wall part 11a.

Card connector 10 is of the so-called "push-in/push-out" type or "push-push" type of card connector that requires the action of pushing a card 31 in inserting the card into the card connector 10 and in discharging the card 31 from the card connector 10. Slide member 14 of the card guide mechanism is slidably attached to the second side arm 11d and configured for sliding movement in the insertion direction of the card 31 upon insertion of a card 31 into the card connector.

The slide member 14 has a first engaging part 14b and a second engaging part 14d. The first engaging part 14b is integrally formed so as to project from an inner side surface of a slide cam 14a of the slide member 14. A projecting engagement-claw 14c extends so as to project inwardly of the housing 11 is integrally formed at the tip of the first engaging part 14b. The shape of the first engaging part 14b including the projecting engagement-claw 14c corresponds to the shape of the right corner portion at the leading end in the insertion direction of the card 31, thus allowing for abutment of the front surface and the side surface of the right corner portion at the leading end in the insertion direction of a card 31 inserted in the card connector 10.

A projection-like second engaging part 14d that projects inwardly of the housing 11 is integrally formed with a portion of the slide cam part 14a that extends rearward from the first engaging part 14b on the inner side surface of the slide cam part 14a. The second engaging part 14d is configured to engage the side edge or surface 33 of card 31. This enables the slide member 14 to engage the card 31 on both the front edge 34 and side edge 33 through the first and second engaging parts 14b and 14d, and move together with the card 31 in the back-and-forth or insertion direction.

An urging member 15 in the form of a coil spring is mounted in the second side part 11d and urges slide member 14 forwardly, or away from rear wall 11b. Opposite ends of the urging member 15 abut against a backstop 11f of the rear wall 11b and the rear end 14k of the slide cam 14a, and are engaged with a first projection 11g projecting forwardly from the backstop 11f and a second projection 14f projecting rearwardly from the rear end 14k of the slide cam part 14a.

One end of pin member 17 is engaged to an end or stopper part 11h formed at the front end of the second side part 11d, and the other end of the pin member 17 is engaged with a cam groove 14e as a slide cam formed on the upper surface of the slide cam part 14a. The pin member 17 cooperates with the cam groove 14e for permitting the slide member 14 to move together with the card 31 to perform push-push action as is known in the art. When the card 31 moves in the insertion direction and reaches the terminus by the pushing action of pushing the card in the insertion direction, the card guide mechanism causes the card 31 to move from the terminus in the opposite direction of the insertion direction to thereby discharge the card by the urging force of the urging member 15. Since the cam mechanism for performing the push-push action (i.e., the interaction between the pin member 17 and the cam groove 14e) is well known, its description is omitted.

A first contact member 21 and a second contact member 22 are attached to the first side arm 11c. The first and second contact parts 21 and 22 create closed and open circuits by electrically connecting to each other and separating from each other, respectively, thus functioning as a switch. The switch may be used as any kind of switch, such as a detection switch to detect that the card 31 is properly inserted into the card connector 10, or a write protect switch to prohibit writing of new information into the card 31 as is known in the art.

Figure 3:
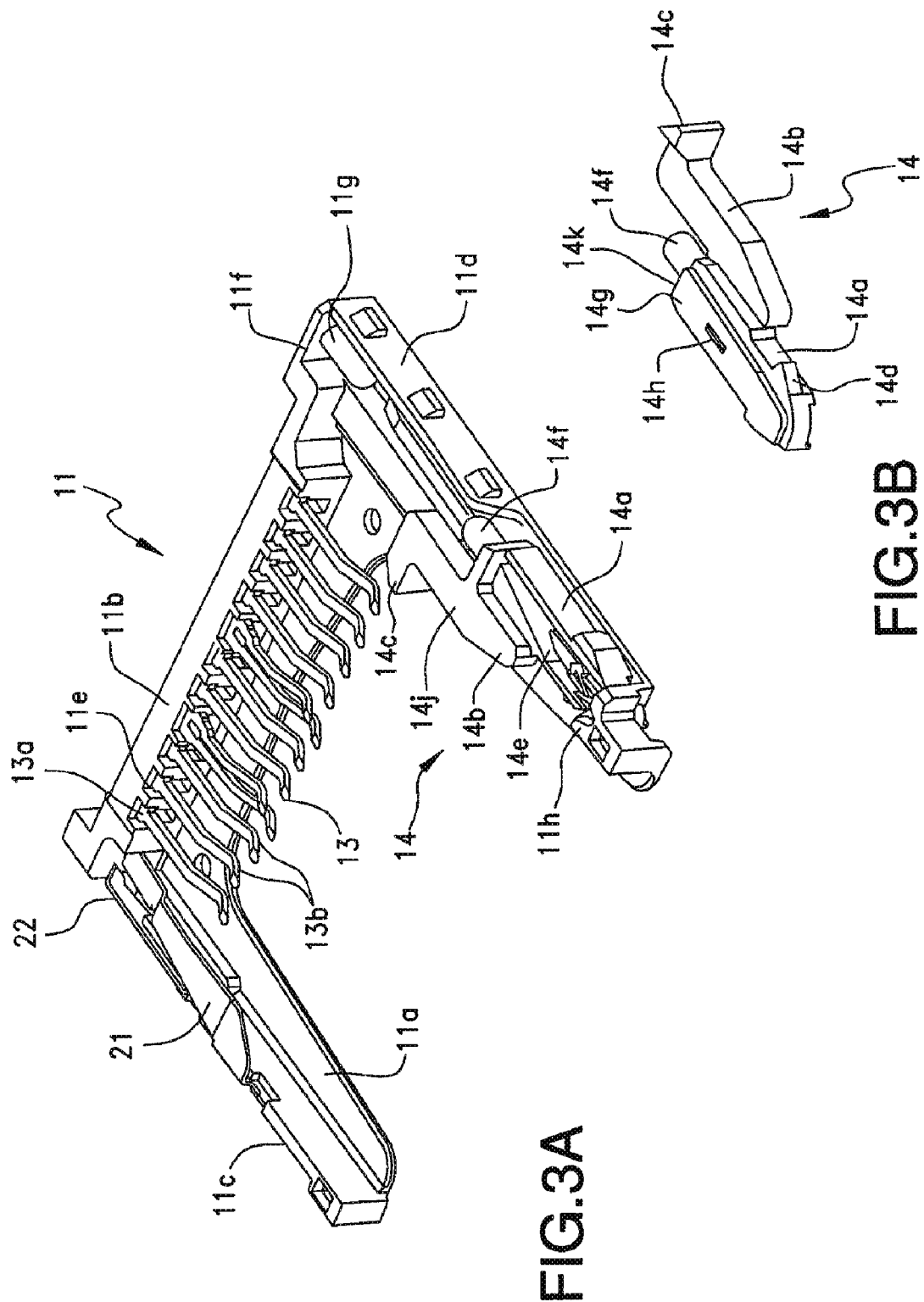
FIG. 3A is a perspective view of the card connector with an urging member and a pin member removed for clarity.
FIG. 3B is a perspective view of the back or bottom of the slide member removed from the card connector.

Referring to FIGS. 3A and 3B, the slide member 14 of the card guide mechanism has a flat slide surface 14g that is formed on the back of the slide cam part 14a. FIG. 3A shows the connector 10 with urging member 15 and pin member 17 removed for clarity and FIG. 3B shows the back or bottom of slide member 14 removed from the housing 11.

An upper surface 14j of slide member 14 is formed on the opposite side of the slide surface 14g of the first engaging part 14b and abuts the inside of the top surface 12a of the shell 12 with a slight clearance there between. When the slide member 14 moves, the upper surface 14j cooperates with the top surface 12a of the shell 12 to limit the upward movement of the slide member 14 thereby to prevent an increase in the clearance between the slide surface 14g and the guide surface 11i. That is, maintaining the clearance formed between the slide surface 14g and the guide surface 11i at a predetermined amount stabilizes the damping effect. In order to allow the shell 12 to limit the upward movement of the slide member 14, the first preferred embodiment utilizes a planar upper surface part 14j to abut shell 12. In the alternative, the abutment surface may be formed by a plurality of projections or the like that are formed on slide member 14 and project upward to define the upper surface part 14j.

The slide surface 14g is further provided with a first recess 14h functioning as a lubricant storage portion or reservoir portion. The first recess 14h has an opening into the slide surface 14g, and it can reserve in its interior a lubricant such as grease. Although the shape of the opening of the first recess 14h is shown in FIG. 3B as a rectangle, it may be of any desired shape such as square, triangle, circle, ellipse, or the like. Although the number of the first recesses 14h illustrated in FIG. 3B is one, it may be two or more. Additionally, the position and layout of the first recesses 14h can be determined suitably.

Figure 5:
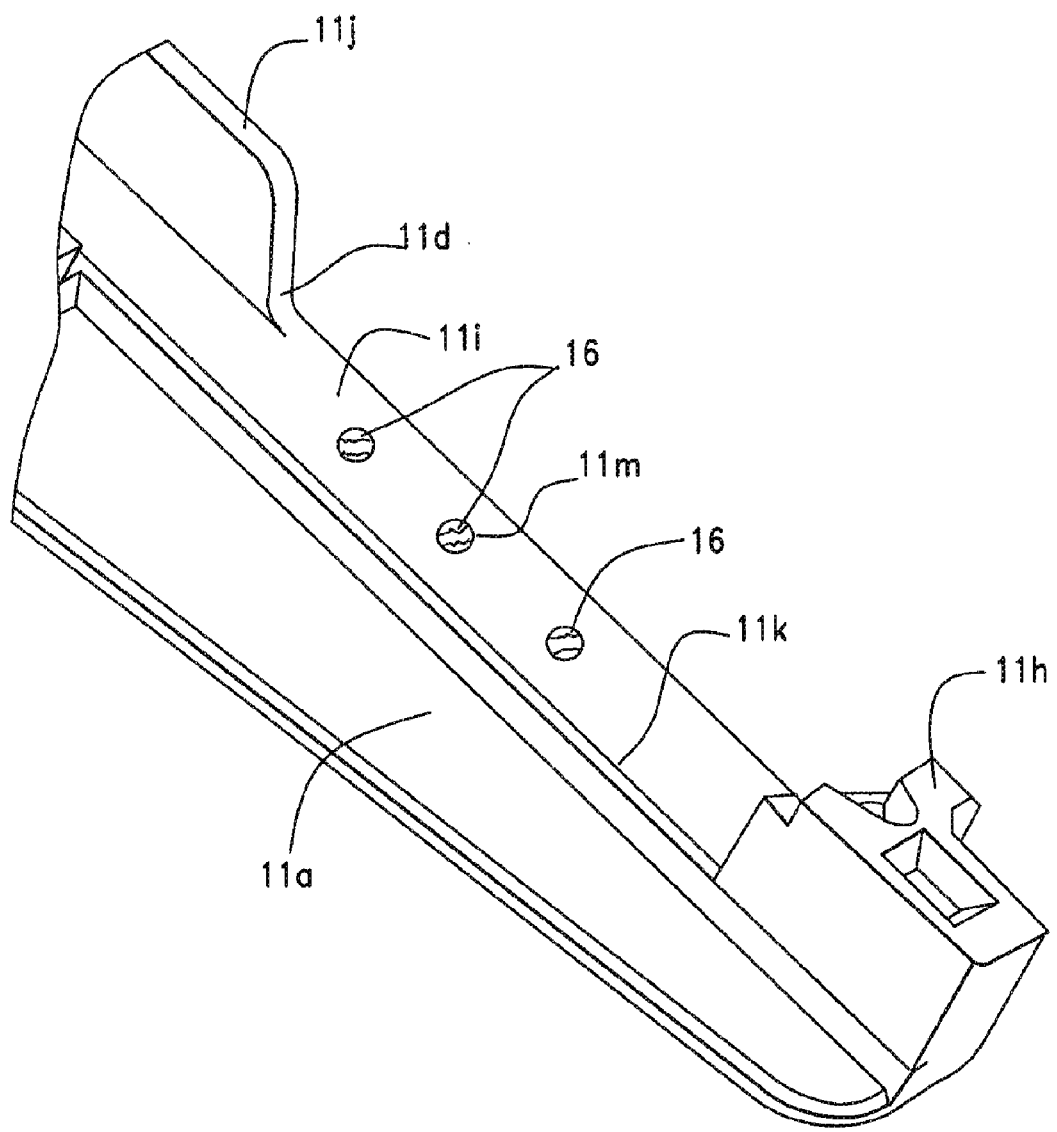
FIG. 5 is an enlarged perspective view of a side arm of the card connector along which the slide member travels.

The second side part or arm 11d has a flat guide surface 11i that is parallel to the bottom wall 11a and extends in the insertion direction B of the card 31. Second side wall 11j that is perpendicular to the bottom wall part 11a and also extends in the insertion direction B. As best seen in FIG. 5, partition 11k is positioned at and defines a boundary between the bottom wall 11a and the guide surface 11i, and is perpendicular to the bottom wall 11a and extends in the insertion direction B of the card 31.

Figure 4:
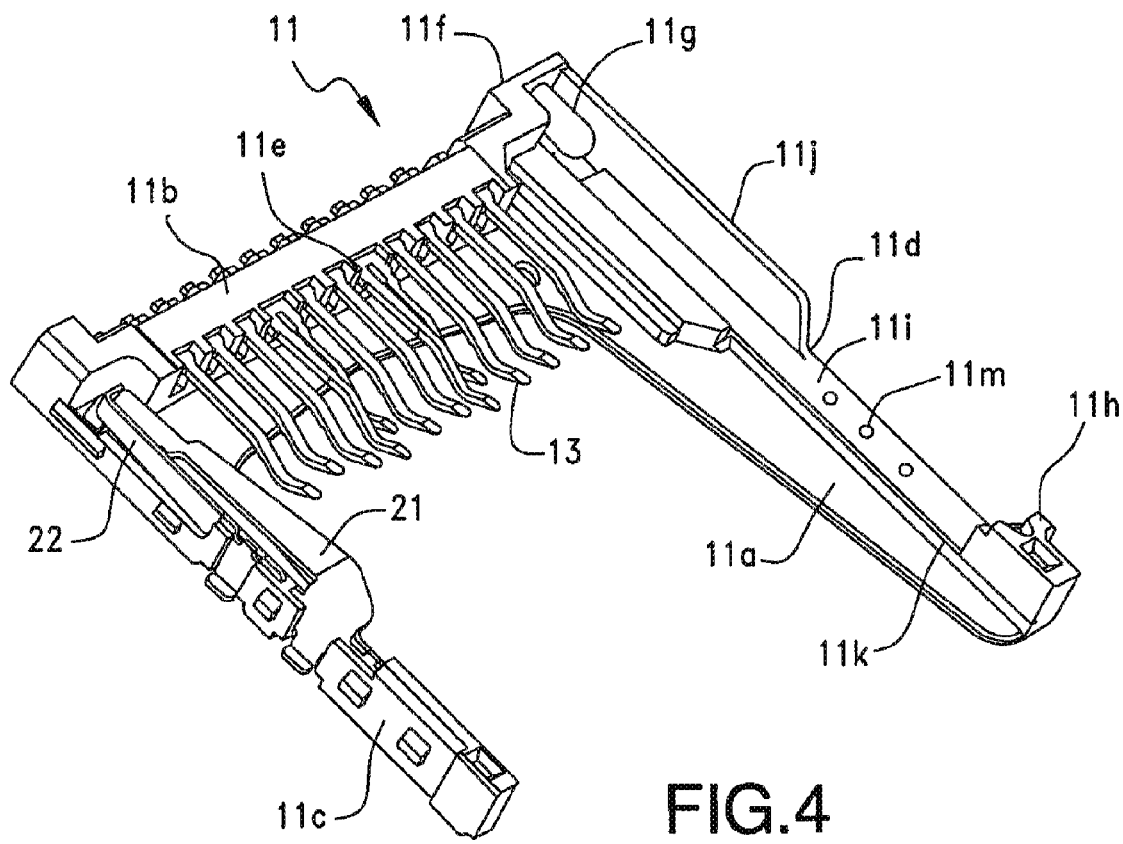
FIG. 4 is a perspective view of the card connector with a slide member removed.

Slide member 14 slides along and is guided by guide surface 11i as it slides in the insertion direction. Partition 11k prevents slide surface 14g of slide member 14 from moving laterally and engaging bottom wall 11a. The guide surface 11i has one or more second recesses 11m functioning as a lubricant storage portion or reservoir. The second recesses 11m have openings into the guide surface 11i, and can store in its interior lubricant such as grease. Although the shape of the openings of the second recess 11m illustrated in FIGS. 4 and 5 are circles, they may be of any desired shape such as rectangle, square, triangle, ellipse, or the like. Although the number of the second recesses 11m is three in the illustrated example, it may be one, two, four or more. Additionally, the position and layout of the second recesses 11m can be determined suitably.

The partition 11k projecting upward from the guide surface 11i also functions as a seal to prevent the lubricant on the guide surface 11i from traveling onto the bottom wall part 11a. The partition 11k has a height to such a degree that the projecting engaging claw 14c and the second engaging part 14d of the slide member 14 are allowed to project inwardly of the housing 11 past the partition 11k. Alternatively, the partition 11k may be formed on both sides of the guide surface 11i to create a U-shaped channel. In such an alternate embodiment, a track is created within which the slide member 14 slides. In the embodiment shown in FIGS. 1-6, slide member 14 is retained between shell 12 and guide surface 11i.

Figure 4A:
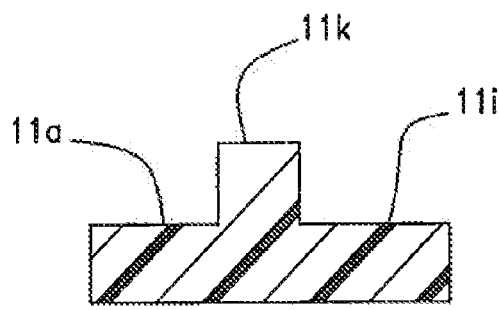
FIG. 4A is a cross section of FIG. 4, taken along line A-A.
Figure 4B:
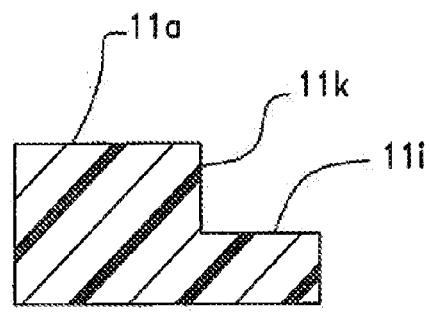
FIG. 4B is a cross section similar to FIG. 4A of an alternate embodiment of the card connector.

FIG. 4A is a cross-section of FIG. 4, taken along line A-A and it shows the general configuration of the guide surface 11i of the housing 11. As shown therein, it can be seen that the housing includes a raised partition, or barrier wall, 11k that extends lengthwise along the extent of the housing. This raised wall serves as a barrier to the viscous damping material to substantially prevent the migration of the viscous damping material to the interior of the connector where it may contaminate the terminals 13. FIG. 4B is a cross-section of an alternate embodiment of the side rail or member of the housing 11, where the barrier wall has a stepped configuration. The wall rises up from the guide surface 11i to meet level with the bottom wall part 11a.

In accordance with the first preferred embodiment, lubricant 16 (FIG. 5) is applied between the guide surface 11i and the slide surface 14g. If the lubricant is liquid of too low a viscosity, it will most likely flow off and around guide surface 11i and slide surface 14g. Hence, preferably, the lubricant is grease that is relatively high in viscosity and low in flowability.

In the first preferred embodiment the primary objective of applying lubricant is to have the guide surface 11i and the slide surface 14g of the housing 11 function as a parallel-plate type viscous damper thereby to slow down the travel speed of the slide member 14 when it is moved from its fully inserted position in the opposite direction of the insertion direction of the card 31 by the urging force of the urging member 15. Just as a viscous damper utilizes the viscosity resistance of viscous flow, and resistance force is proportional to velocity, the present invention uses the viscosity of the lubricant in a positive manner. The fluid used in a viscous damper is preferably high in viscosity.

Applying grease as a dampener between the guide surface 11i and the slide surface 14g will have the effects as set forth below. Since the travel speed of the card 31 when pushed by the user's hand and finger during insertion is low, the affect of the lubricant on the slide member 14 is likewise low and the lubricant barely increases the force required to insert the card 31. On the other hand, when the force of the urging member 15 causes the slide member 14 to move in the opposite direction of the insertion direction thereby to discharge the card 31, the travel speed of the slide member 14 moving together with the card 31 is higher, so that the lubricant has a greater affect and slide member 14 receives a larger resistive force due to the lubricant and the travel speed is slowed down. This prevents the card 31 from being expelled too quickly from the card connector 10 and also reduces mechanical shock when the slide member 14 engages the stopper part 11h and comes to a stop.

The function as a viscous damper can vary according to the characteristics of the grease. Therefore, the inventor of the present invention conducted an experiment by manufacturing the card connector 10 and using various types of grease at normal operating temperatures in order to specify the characteristic of grease that enables the speed of the slide member 14 to be reduced to an appropriate value. The characteristic of grease that corresponds to viscosity as the characteristic of lubricant is consistency. As used herein, the term "consistency" is a characteristic value indicating the hardness of the grease and the greater the number, the softer the grease. In general, a greater consistency means a lower apparent viscosity of the grease. As a further definition, consistency means the consistence of an extremely viscous substance to resist deformation. According to Japanese Industrial Standard JIS K2220-5.3.2, the consistency is determined such that: a cone having a predetermined shape (mass: 102.5±0.05 g) is moved perpendicularly into a sample for 5.0±0.1 seconds together with a holding section (mass: 45.50±0.02 g); the depth of movement obtained in the vertical direction in this procedure is measured; and a reading of the index is multiplied by 10.

The inventor carried out the experiment as to whether the speed of the slide member 14 could be reduced properly by using each of a plurality of greases that differed from one another in consistency. The results are shown in Table 1.

TABLE 1

|  | A | B | C |
| --- | --- | --- | --- |
| Consistency | 280 | 290 | 310 |
| Goodness to connector | excellent | good | good |

Every grease used in the experiment was torque grease manufactured by Sankei Kagaku Co., Ltd in Japan. The articles indicated by A, B, and C are the products called TGK-6, TGK-7, and TGK-8, respectively. Torque grease is used with machine parts, gears, and rotating parts, etc. that are made of metal or synthetic resin. The consistencies shown in Table 1 were measured according to JIS-K2220-5.3.2. In the experiment, approximately 400 mm$^3$ of grease was applied between the guide surface 11i and the slide surface 14g by using a dispenser.

It will be apparent from the results shown in Table 1 that it is desirable to use grease whose consistency is not more than 310, and more preferably not more than 280. A constant clearance between the guide surface 11i and the slide surface 14g stabilizes the amount of grease entering the clearance, thereby stabilizing the damping effect of the viscous damper. The damping effect can be adjusted by adjusting the dimension of the clearance and the amount of grease.

In operation, a user inserts card 31 from the front 15 of the card connector 10 by the hand and finger, or the like. The card 31 is inserted in the position as shown in FIG. 2, with respect to the card connector 10. In the initial stage of insertion, the contact pads 32 of the card 31 have not yet reached the location of the terminals 13. The right corner portion 34 at the leading end in the insertion direction of the card 31, and the right side surface 33 are not engaged with the first engaging part 14b and the second engaging part 14d of the slide member 14 of the card guide mechanism. As shown in FIG. 1, the slide member 14 is stopped with its front end (adjacent second engaging part 14d), abutting against the stopper part 11h. The first and second contact members 21 and 22 are not in contact, so that the detection switch is turned off.

Subsequently, when the user further pushes the card 31, the engaging parts formed on the right corner portion 34 and the right side surface 33 at the leading end in the insertion direction of the card 31 engages with the first and second engaging parts 14b and 14d, respectively, and the card 31 moves together with the slide member 14 toward the rear wall 11b. At this time, the slide member 14 compresses the urging member 15 composed of a coil spring, so that the slide member 14 and the card 31 are moved against the spring force of the urging member 15. The spring force is small enough that it is easily overcome by the push force developed by the user's hand and finger, or the like, as it is known in the art.

Grease is applied between the slide surface 14g of the slide member 14 and the guide surface 11i of the housing 11, in order to achieve the function as a parallel-plate type viscous damper. Since the travel speed of the card 31 pushed by the user's hand and finger is low, the addition force caused by the damper on the slide member 14 moving together with the card 31 is very small. Accordingly, the presence of the grease does not significantly increase the force required by the user's hand and finger, nor does it cause a drop in the travel speed of the slide member 14 and the card 31. Rather, the function as lubricant achieved by the grease reduces the friction between the guide surface 11i and the slide surface 14g, thus allowing the slide member 14 to move smoothly. This enables the user to appreciate high-quality feeling when pushing the card 31.

Thereafter, the slide member 14 and the card 31 reach the terminus that is the fully advanced position, and enter the full-stroke state. Near the middle of travel of the card 31, its upper surface at the leading end 35 engages the lower projection of the first contact member 21 thereby to displace upward the body part of the first contact member 21. As a result, the first abutment portion of the first contact member 21 is displaced upward and abuts the second abutment portion of the second contact member 22, thus establishing continuity across the first and second contact members 21 and 22. Through such a structure, the switch is turned on, designating that card 31 is inserted properly into the card connector 10.

When the user stops the action of pushing the card 31 and releases the push force against the card 31, the repulsive force of the urging member 15 causes the slide member 14 and the card 31 to move in the direction away from the rear wall 11b. As is known in the art, the slide member 14 and the card 31 are thus stopped at an operative, locked position where the card 31 is held in the locked state in the card connector 10. As is known in the art, the pin member 17 engages the cam groove 14e of the slide cam part 14a to stop the action of the slide cam part 14a, thus stopping the slide member 14 at the locked position.

With the card 31 held at the locked position, data may be sent and received in the operative state with the electronic equipment to which the card connector 10 is attached. While the card 31 is held at the locked position, the contact pads 32 of the card 31 contact the contact portions 13b of the terminals 13 to maintain electrical continuity there between. Since the first contact part of the first contact member 21 is abutting the second contact part of the second contact member 22, the detection switch is placed in the on state.

As is known in the art, a user removes card 31 by pushing the card 31 by the hand and finger, or the like, when it is in the operative, locked position. In doing so, the slide member 14 and the card 31 are moved from the locked position towards the rear wall 11b. Further pushing of the card 31 causes the slide member 14 and the card 31 to reach the terminus that is the fully advanced position, and enter the full-stroke state.

Subsequently, when the user stops the action of pushing the card 31 and releases the pushing force against the card 31, the repulsive force of the urging member 15 causes the slide member 14 and the card 31 to move in the direction away from the rear wall 11b and to return in the direction of the locked position. However, as it is known in the art, even as the slide member 14 reaches the locked position, the pin member 17 in cam groove 14e of the slide cam part 14a does not engage cam groove 14e, and the slide member 14 and card 31 the locked position.

The repulsive force of the urging member 15 causes the slide member 14 and the card 31 to be ejected, thereby increasing the travel speed. This enables the slide surface 14g of the slide member 14, the guide surface 11i of the housing 11 and the grease there between to function as a parallel-plate type viscous damper and supply resistive force to the slide member 14, thereby reducing the travel speed of the slide member 14 and the card 31.

Upon the abutment of the front end of the slide member 14 against the stopper part 11h, the slide member 14 and the card 31 come to a stop. Since the travel speed of the slide member 14 and the card is lowered by the viscous action of the grease, the abutment of the front end of the slide member 14 against the stopper part 11h does not cause a large shock on the slide member 14 or the card 14. Through such a structure, engagement is maintained between the engaging parts formed on the right corner portion 34 and the right side surface 33 of card 31, and the first and second engaging parts 14b and 14d of the slide member 14 in the card guide mechanism. In other words, as the slide member 14 returns to the position as shown in FIG. 1, the card 31 will not dash out from the card connector 10 and is maintained in contact with the first and second engaging parts 14b and 14d of the slide member 14. This reduces the possibility of losing the card 31.

The force that the first and second engaging parts 14b and 14d of the slide member 14 exert on card 31 to temporarily hold the card in place is more than sufficient to maintain the card 31 in position within connector 11 when the slide member 14 is brought to a stop by engagement with the stopper part 11h. It is, however, sufficiently less than the force that the user uses to pull the card 31 out of the connector 11 by the hand and finger, or the like. Therefore, the card 31 is temporarily held by the first and second engaging parts 14b and 14d of the slide member 14 until it is removed from the slide member 14 by pulling it with the user's hand and finger, or the like.

As the slide member 14 returns from the terminus to the position as shown in FIG. 1, the body part of the first contact member 21 returns by its own spring force to its original position. Accordingly, the first and second contact members 21 and 22 enter the non-continuity state, and the detection switch changes from the "on" state to the "off" state.

Applying grease between the guide surface 11i and the slide surface 14g enables the guide surface 11i and the slide surface 14g to function as a parallel-plate type viscous damper. When the force of the urging member 15 causes the slide member 14 to move to eject the card 31, the travel speed of slide member 14 and card 31 may be high, so that the damper provides a large resistance force on the slide member 14 and its travel speed is lowered. This prevents the card 31 from quickly dashing or springing out from the card connector 10. This also prevents a large shock from occurring when the slide member 14 is brought to a stop by the abutment against the stopper 11h. On the other hand, during the insertion process, a card 31 pushed by the user's hand and finger, or the like, has a low travel speed, so that the slide member 14 moving together with the card 31 receives very little additional resistive force from the damper.

At least one first recess portion 14h for storing grease is formed in the slide surface 14g, and at least one second recess portion 11m for storing grease is formed in the guide surface 11i. This enables a sufficient amount of grease to be held between the guide surface 11i and the slide surface 14g. The presence of partition 11k extending in the insertion direction on at least one side edge of the guide surface 11i prevents the grease from flowing therearound and from in between the guide surface 11i and the slide surface 14g.

Additionally, the first and second engaging parts 14b and 14d hold the card 31 with sufficient force so as to prevent card 31 from slipping from the slide member 14 when discharging the card 31. This reduces the likelihood that the card 31 will dash out from the card connector 10. Moreover, the card 31 can be easily removed from the slide member 14 by pulling it with the user's hand and finger, or the like.

While the first preferred embodiment has described only the case where the first recess portion 14h is formed on the slide surface 14g and the second recess portion 11m is formed on the guide surface 11i, the first and second recess portions 14h and 11m may be omitted suitably. For example, the slide surface 14g and the guide surface 11i may be a flat surface free from recessed portions. Alternatively, only either one of the slide surface 14g and the guide surface 11i may have the first recess portion 14h or the second recess portion 11m as a recess portion. In addition, the slide surface 14a and the guide surface 11i need not necessarily be smooth surfaces, or they may be a smooth finished surface on which fine irregularities are formed.

Alternatively, the viscous damping material may be retained in a self contained packet that is disposed within one of the recesses. The material used in this application would be a gel like material or grease that is sealed within the packet and projects to provide contact with the guide member slide surface.

Figure 6:
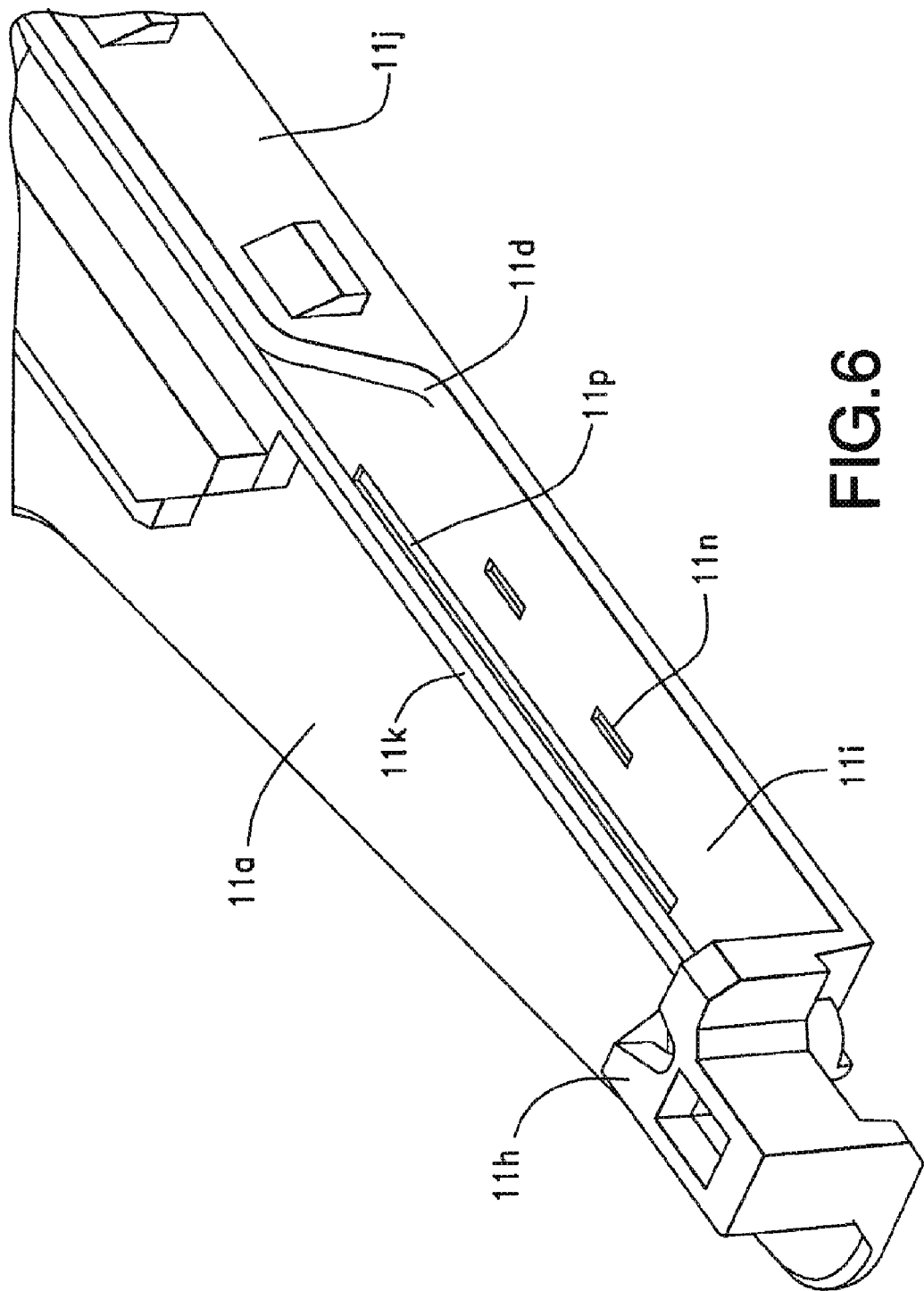
FIG. 6 is an enlarged perspective view of a side arm of a card connector according to a second preferred embodiment of the present invention.
Figure 7:
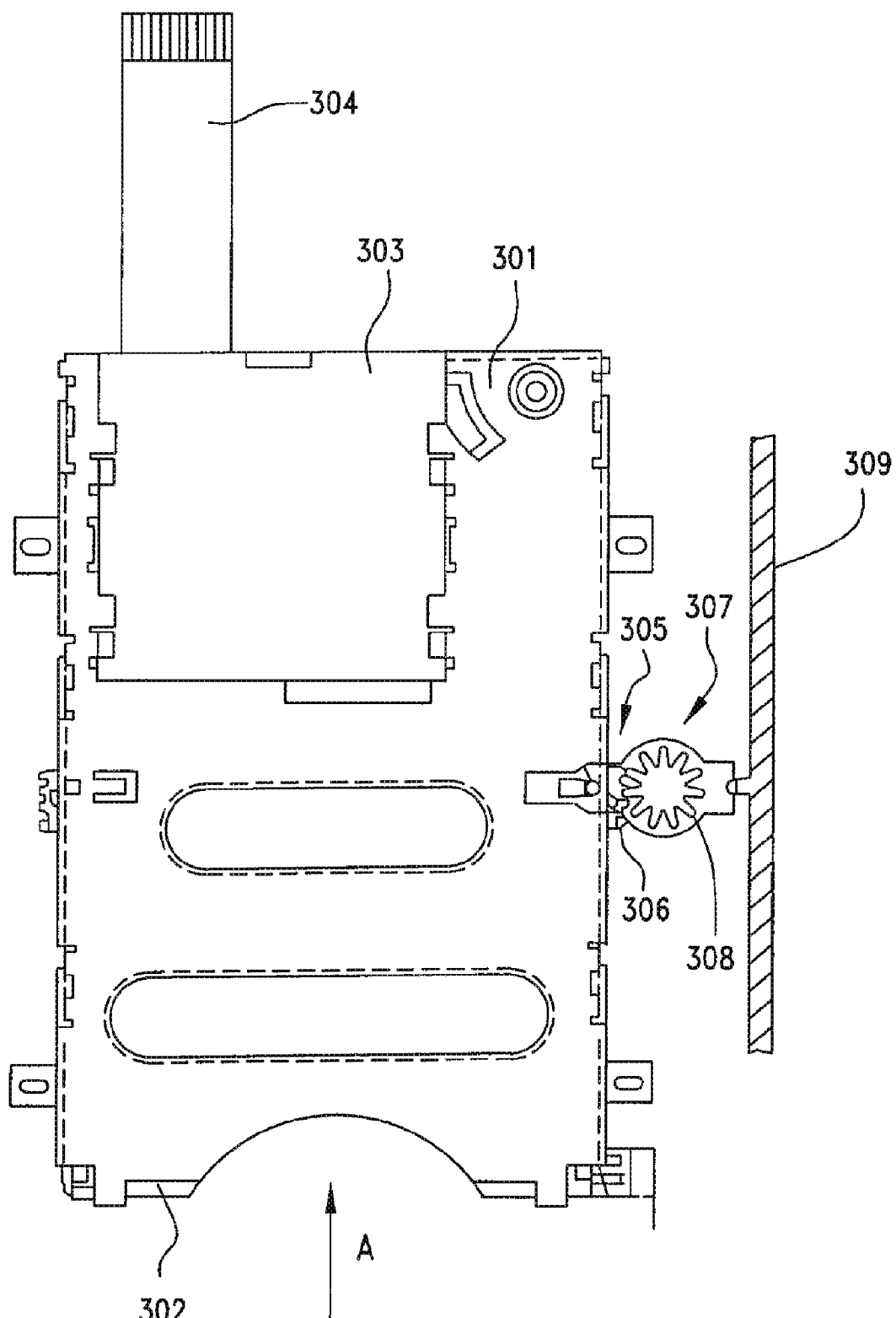
FIG. 7 is a somewhat schematic diagrammatic view illustrating a conventional card connector.

FIG. 6 shows details of a second preferred embodiment of the present invention. Like reference numbers have been used for the same structure as in the first preferred embodiment, and therefore the description thereof is omitted here.

In the second preferred embodiment, a second recess portion 11n functioning as a lubricant storage portion is formed on a guide surface 11i. Like the second recess portion 11m in the first preferred embodiment, the second recess portion 11n is a recess portion with an opening into the guide surface 11i, and it can store, in its interior, lubricant such as grease. The shape of the opening of the second recess portion 11n is a rectangle that is long in the insertion direction of a card 31. Although the number of the second recess portions 11n shown in FIG. 6 is two, it may also be one or three or more. Additionally, the position and layout of the second recess portion 11n can be determined suitably.

The guide surface 11i has a recess groove 11p functioning as a lubricant storage groove or moat, which is adjacent to a partition 11k and extends in the insertion direction of the card 31. The recess groove 11p is a recess groove with an opening into the guide surface 11i, and it can store, in its interior, lubricant such as grease. This enables a sufficient amount of grease to be held between the guide surface 11i and the slide surface 14g. This also enables a large amount of excess grease to be stored in the recess groove 11p. It is therefore able to reliably prevent the grease from flowing therearound from between the guide surface 11i and the slide surface 14g and onto bottom wall 11a. The other construction and operation of the second preferred embodiment are identical to that described with respect to the first preferred embodiment, and therefore the description thereof is omitted here.

It is to be understood that the present invention should not be limited to the foregoing preferred embodiments and thus, various changes and modifications will occur to a person skilled in the art based on the gist of the invention, and they should not be excluded from the scope of the invention.

What is claimed is:

1. A memory card connector, comprising:
    a housing for receiving a memory card therein, the housing including a base portion and at least one side rail extending from the base portion, the base portion and side rail cooperatively defining an interior space of said connector into which said memory card can be inserted by a user, the housing base portion supporting a plurality of conductive terminals at least partially within the connector interior space;
    a slide member for guiding a memory card into and out of said connector interior space, the slide member being slidable in first and second, opposite directions along the one side rail, said slide member including a slide surface that contacts and slides along said one side rail;
    a biasing member applying a biasing force to said slide member which urges said slide member in the second direction; and,
    a reservoir interposed between said slide surface and side rail, the reservoir including a viscous damping material having a consistency sufficient to at least partially retard a biasing force applied by the biasing member to a memory card in said connector interior space to retard movement of said slide member and said memory card in said second direction.

2. The card connector of claim 1, wherein said reservoir is disposed in said one side rail.

3. The card connector of claim 1, wherein the viscous damping material has a consistency of less than about 310 as measured according to Japanese Industrial Standard K2220-5.3.2.

4. The card connector of claim 1, wherein said viscous damping material has a consistency of no more than about 280 as measured according to Japanese Industrial Standard K2220-5.3.2.

5. The card connector of claim 1, wherein the viscous damping material has a consistency between about 280 and about 310 as measured according to Japanese Industrial Standard K2220-5.3.2.

6. The card connector of claim 3, wherein said viscous damping material is a torque grease.

7. The card connector of claim 1, wherein said reservoir includes a first recess disposed in said slide rail.

8. The card connector of claim 1, wherein said reservoir includes a plurality of recesses disposed in said slide rail.

9. The card connector of claim 8, wherein said recesses are spaced apart from each other.

10. The card connector of claim 9, wherein said recesses are arranged in a line along said side rail.

11. The card connector of claim 1, wherein said one side rail includes a guide surface that opposes said slide member slide surface and said reservoir is in contact with one of said slide surface and guide surface.

12. The card connector of claim 1, wherein said one side rail further includes a barrier wall that separates said reservoir from said connector interior space.

13. The card connector of claim 7, wherein said first recess is generally rectangular.

14. The card connector of claim 1, further including a second guide rail spaced apart from the one guide rail and said biasing member is disposed along said one guide rail.

15. The card connector of claim 1, wherein said viscous damping material is contained within a packet which is disposed in said reservoir.

16. The card connector of claim 15, wherein said viscous damping material includes a viscous gel.

* * * * *